(12) United States Patent
Aubin-Marchand et al.

(10) Patent No.: US 10,870,966 B2
(45) Date of Patent: Dec. 22, 2020

(54) PIVOT OFFSETTING IMPLEMENT ASSEMBLY ATTACHMENT SYSTEM FOR A VEHICLE

(71) Applicant: SOUCY INTERNATIONAL INC., Drummondville (CA)

(72) Inventors: Jeremie Aubin-Marchand, St-Hugues (CA); Karen Provencher, Drummondville (CA); Normand Roy, St-Hugues (CA); Michael Bergeron, Drummondville (CA); Yan Roger, Drummondville (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 438 days.

(21) Appl. No.: 15/840,939

(22) Filed: Dec. 13, 2017

(65) Prior Publication Data
US 2018/0328002 A1    Nov. 15, 2018

Related U.S. Application Data

(60) Provisional application No. 62/433,629, filed on Dec. 13, 2016.

(51) Int. Cl.
| | | |
|---|---|---|
| *E01H 5/06* | (2006.01) | |
| *E02F 9/08* | (2006.01) | |
| *E02F 3/815* | (2006.01) | |
| *E02F 9/00* | (2006.01) | |
| *E02F 3/36* | (2006.01) | |

(Continued)

(52) U.S. Cl.
CPC ............ *E02F 9/006* (2013.01); *E01H 5/063* (2013.01); *E02F 3/3604* (2013.01); *E02F 3/7627* (2013.01); *E02F 3/7631* (2013.01); *E02F 3/627* (2013.01); *F16C 11/045* (2013.01); *F16C 2326/20* (2013.01)

(58) Field of Classification Search
CPC .......... A01B 59/06; B60R 11/06; E01H 5/06; E01H 5/063; E01H 5/066; E02F 3/3606; E02F 3/3604; E02F 3/7627; E02F 3/7622; E02F 3/7645; E02F 3/7631; E02F 3/8157; E02F 3/968; E02F 3/627; E02F 9/0808; E02F 9/003; E02F 9/006
USPC ........... 37/231–235, 266; 172/272–275, 817, 172/830
See application file for complete search history.

(56) References Cited

U.S. PATENT DOCUMENTS

| | | |
|---|---|---|
| 4,304,056 A | 12/1981 | Watson et al. |
| 5,125,174 A | 6/1992 | Watson et al. |

(Continued)

*Primary Examiner* — Robert E Pezzuto
(74) *Attorney, Agent, or Firm* — BCF LLP

(57) ABSTRACT

An attachment system for attaching an implement mounting assembly to a vehicle. The attachment system includes a vehicle attachment component that is fastenable to a front portion of the frame of the vehicle, and a frame attachment component that is removably attachable to the vehicle attachment component on one end via a securing axis, and pivotably attachable to the implement assembly on another end about a pivoting axis. When fastened to the vehicle, the vehicle attachment component is located upward from the underside of the frame. When the frame attachment component is attached to the vehicle attachment component, the securing axis is located upward from the underside portion of the frame, and the pivoting axis is located downward therefrom.

14 Claims, 18 Drawing Sheets

(51) Int. Cl.
  *E02F 3/76*   (2006.01)
  *E02F 3/627*  (2006.01)
  *F16C 11/04*  (2006.01)

(56) References Cited

U.S. PATENT DOCUMENTS

| | | |
|---|---|---|
| 6,276,076 B1 | 8/2001 | Quenzi et al. |
| 6,526,677 B1 * | 3/2003 | Bloxdorf .............. E01H 5/06 37/231 |
| 6,557,275 B2 | 5/2003 | Curtis |
| 6,928,757 B2 | 8/2005 | Bloxdorf et al. |
| 7,963,052 B2 | 6/2011 | Koch et al. |
| 8,763,280 B1 * | 7/2014 | Fournier .............. E01H 5/06 37/235 |
| 8,763,715 B2 | 7/2014 | Osgood |
| 9,145,915 B2 | 9/2015 | Coulombe et al. |
| 9,347,199 B2 | 5/2016 | Gendron et al. |
| 10,604,902 B2 * | 3/2020 | Aubin-Marchand ....... E02F 3/7622 |
| 2003/0110666 A1 | 6/2003 | Kost et al. |
| 2005/0166428 A1 | 8/2005 | Hollinrake et al. |
| 2005/0206126 A1 * | 9/2005 | Harris .............. E02F 3/7627 280/479.1 |
| 2007/0101620 A1 | 5/2007 | Roy |
| 2007/0187118 A1 | 8/2007 | Belanger |
| 2016/0289915 A1 | 10/2016 | Lauziere et al. |

\* cited by examiner

PIVOT OFFSETTING IMPLEMENT ASSEMBLY ATTACHMENT SYSTEM FOR A VEHICLE

CROSS-REFERENCE TO RELATED APPLICATIONS

The present application claims priority to U.S. Provisional Patent Application Ser. No. 62/433,629, filed Dec. 13, 2016, entitled "Pivot offsetting front mounting system for a support frame and method of using same", which is incorporated by reference herein in its entirety.

TECHNICAL FIELD

The present technology relates to an attachment system for attaching a work implement mounting assembly to a vehicle, and more particularly the present technology relates to an attachment system having a vehicle attachment component and a frame attachment component for facilitating the attachment of the work implement mounting assembly to the vehicle and for facilitating the operation of the work implement when mounted to the vehicle thereby.

BACKGROUND

All-terrain vehicles ("ATV" or "ATVs"), utility-terrain vehicles ("UTV" or "UTVs"), side-by-side vehicles ("SSV" or "SSVs") and other similar vehicles may be mounted with a work implement to perform utilitarian work. For example, a plow can be mounted to such vehicles for displacing snow, dirt, gravel, soil, etc. The work implement is typically removably mounted to the frame of the vehicle via an implement mounting assembly. Implement mounting assemblies typically have a front portion attachable to the work implement, and a rear portion at least indirectly attachable to a portion of the vehicle usually located forward from a front axle of the vehicle. In addition to horizontally displacing loads along a ground surface, some implement mounting assemblies being at least indirectly pivotably attached to the vehicle may be operated to pivot, thereby allowing the vertical displacement of loads such as carrying a load accumulated in the work implement from the ground surface and into a dumpster.

Among the several different configurations of implement mounting assemblies available on the market, a plurality can be categorized either as front-mounted (i.e. attachable to the vehicle via an attachment point located on a front portion of the vehicle) or as underside-mounted (i.e. attachable to the vehicle via an attachment point located on an underside portion of the vehicle). Typically, the benefits derived from a front-mounted configuration are two-fold. First, the installation process is generally facilitated due to the accessibility of the front portion of the vehicle by the user and thereby not requiring, under certain circumstances, to jack the vehicle from the ground surface in order to attach the implement assembly thereto. Second, when the implement mounting assembly is at least indirectly pivotably attached with respect to the vehicle, such front-mounted configurations may, under certain circumstances, benefit from an appreciable range of upward pivoting due to the clearance generally found in front and above the attachment point of the vehicle and of the rear portion of the attached implement mounting assembly.

Underside-mounted configurations generally benefit from an improved horizontal pushing performance compared to most front-mounted configurations. Typically, when a vehicle attached with an implement mounting assembly is operated over a horizontal ground surface and is horizontally pushing a load via the work implement along the ground surface, the front portion of the implement mounting assembly attached to the work implement is positioned at a vertical position that is close to the ground and usually below the lowermost point of the underside of the vehicle. The lowermost point of the underside of the vehicle may be defined by the underside portion of the frame or may be defined by a vehicle accessory attached thereto, such as a skid plate. On the other hand, the rear portion of the implement mounting assembly is typically attached to the frame of the vehicle and therefore positioned higher than the front portion of the implement mounting assembly, thereby defining a vertical component to the vector along which the operated vehicle indirectly imparts a pushing force to the load. Conventionally, the horizontal pushing capacity may be improved by minimizing the amount of friction generated between the work implement and the ground surface, the friction working horizontally against the momentum of the operated vehicle and being a function of the vertical component of the force applied from the work implement toward the ground.

Under certain circumstances, horizontal pushing capacity improvements may be achieved by underside-mounted configurations, the vehicle having an attachment point on an underside portion of the frame, the attachment point located rearward from the foremost portion of the frame. Understandably, a notional rearward displacement of the attachment point toward the front axle would require a notional extension to the length of the implement mounting assembly for the mounted work implement to maintain a proper operating position in front of the vehicle. Conventionally, such a configuration would increase the proportion of the horizontal component of the pushing force vector over the vertical component thereof, thereby improving the horizontal pushing capacity of the vehicle. However, such underside-mounted attachment systems, resulting in a portion of the implement mounting assembly extending underneath the frame of the vehicle and within the ground clearance of the vehicle may, under certain circumstances, be prone to adverse impacts against irregularities of the ground surface. Furthermore, some vehicles may not have sufficient ground clearance to be equipped with some underside-mounted attachment systems. Also, when the implement mounting assembly is at least indirectly pivotably attached with respect to the vehicle, such underside-mounted attachment systems may, under certain circumstances, undesirably limit the range of upward pivoting due to the obstacles generally found in front and above the attachment point of the vehicle and of the rear portion of the attached implement mounting assembly.

Generally, the process of attaching an implement mounting assembly to a vehicle is tedious, whether the implement mounting assembly is attachable directly to the vehicle or otherwise indirectly via an attachment system. Even when the process is aided by the implement mounting assembly being attachable to a winch of the vehicle and towable thereby toward the interface of the vehicle, the user may need to step down from the vehicle to perform steps in the process. For example, when the implement mounting assembly is suspended by a cable of the winch, the user may need to maneuver the implement mounting assembly to establish the prerequisite position and orientation of the rear portion of the implement mounting assembly with respect to the attachment point of the vehicle or of the attachment system for the process to complete.

Some technologies known in the art make use of an attachment system in an attempt to improve the process of attaching an implement mounting assembly to a vehicle or to improve the pushing performance thereof. Such technologies may comprise a vehicle attachment component that is fastenable to a front or underside portion of the vehicle, and a frame attachment portion that is attachable to the implement mounting assembly and removably attachable to the vehicle component assembly. However, some vehicles were not designed in anticipation of being mounted with a work implement, their front and underside portions lacking the sufficient space to accommodate the vehicle attachment component. Also, known attachment systems may have a limited capacity to bear conventional operating loads. Moreover, known similar systems attempting to mitigate the aforementioned drawbacks include a vehicle attachment component that undesirably leaves weight and bulk onto the vehicle once the frame attachment component has been detached from the vehicle attachment component for the vehicle to be operated without the work implement.

Therefore, improvements to attachment systems for implement mounting assemblies and to methods for attaching implement mounting assemblies to a vehicle are desirable.

SUMMARY

It is therefore an object of the present technology to ameliorate the situation with respect to at least one of the inconveniences present in the prior art.

It is also an object of the present technology to provide an improved attachment system for implement mounting assemblies at least in some instances as compared with some of the prior art.

In the present specification, the terms "longitudinally" and "longitudinal" mean in a direction parallel to the lengthwise direction of a vehicle equipped with the attachment system of the present technology and disposed on a horizontal ground surface. The terms "laterally" and "lateral" mean in a direction horizontally transverse to the longitudinal direction. The terms "vertically" and "vertical" mean in a direction perpendicular to the horizontal ground surface and to a plane formed by the longitudinal and lateral directions. A central lateral plane is formed by the longitudinal and vertical directions and coinciding with the centerline of the vehicle as defined in the lateral direction, defining left and right sides of the vehicle.

The present technology was created with the intent to improve upon at least one of the drawbacks of the typical conventional attachment systems.

Typical common attachment systems having a front mounted configuration will attach to the work implement mounting assembly via a first portion that is close to the ground surface, and attach to the vehicle on a front portion of the frame above the underside thereof via a second portion, the second portion positioned higher than the first portion. With such attachment systems, the issue arising is that the force imparted toward the work implement by the vehicle is transferred to the ground surface, thereby generating friction which adversely affects the pushing performance of the vehicle.

Moreover, typical common attachment systems having an underside mounted configuration will attach to the vehicle onto an underside portion of the frame thereof via a second portion, potentially improving the pushing performance of the vehicle. However, such attachment systems are known to either be challenging to install by the user due to the limited accessibility of the underside portion of the frame. Underside mounted configurations may also limit the range of upward pivoting of the attached implement mounting assembly, obstructed by the portions of the vehicle located forward from the underside portion. Other known underside mounted attachment systems may include a portion that extends below and forward from the underside portion of the frame, although such attachment systems maintain an undesirable bulk below and forward from the frame of the vehicle, hindering the operation of the vehicle when a work implement mounting assembly is not attached thereto.

Another issue is that typical conventional attachment systems interface with the vehicle on a limited area thereof, for example via a uni-directional fastenable interface oriented forward, which may inadequately distribute and bear conventional operating loads from the work implement assembly to the vehicle.

Yet another issue is that the process of attaching the typical conventional attachment systems requires the user to step down from the vehicle and intervene to longitudinally and laterally align the work implement mounting assembly with respect to the vehicle.

According to an aspect of the present technology, there is provided an attachment system for implement mounting assemblies, the attachment system comprising a vehicle attachment component fastenable to the vehicle and a frame attachment component pivotably attachable to the work implement assembly and removably attachable to the vehicle attachment component. The frame attachment component defines a securing axis at the attachment interface with the vehicle attachment component and defines a pivoting axis at the attachment interface with the work implement assembly. When the work implement mounting assembly is attached to the vehicle via the attachment system, the pivoting axis is located below the underside of the frame of the vehicle, thereby enabling the vehicle with an adequate longitudinal load pushing performance under certain circumstances.

When fastened to the vehicle, the vehicle attachment component is located within the envelope of the vehicle (i.e. rearward from the foremost point of the vehicle, and upward from the lowermost point of the frame of the vehicle). As such, under certain circumstances, the vehicle may be operated unhindered without a work implement assembly.

The vehicle attachment component includes a fastenable interface that has front, lateral and underside fastenable portions, together fastenable to the front portion of the frame of the vehicle in three directions (longitudinal, lateral and vertical). The vehicle attachment component further includes an abuttable interface that has front, lateral and underside abutments for abutting with portions of the frame attachment component in three directions (longitudinal, lateral and vertical). The fastenable interface and the abuttable interface are defined on opposite sides of the vehicle attachment component. When the vehicle attachment component is fastened to the vehicle, the abuttable interface extends forward and downward from the front portion of the frame of the vehicle. Also, the vehicle attachment component includes securable members extending laterally outward from the abuttable interface, used in the attachment process together with portions of the frame attachment component for alignment and attachment thereof to the vehicle attachment component.

The frame attachment component includes left and right lateral plates oriented longitudinally and vertically, and joined to one another via a linkage disposed transversely therebetween. From the lateral plates, left and right leading flanges extend upward and forward, and left and right trailing flanges extend upward and rearward. The leading and trailing flanges have leading and trailing guiding portions that converge downward toward passages, the passages shaped as vertical slots extending downward into the lateral plates and terminating into housings. The leading and trailing portions are adapted to guide the frame attachment component along the securable members to facilitate the longitudinal alignment thereof with the passages. The passages are adapted to receive the securable members and lead them toward the housings as the frame attachment component is being mated to the vehicle attachment component. The housings provide a vertical stop against the securable member, thereby defining the securing axis.

The frame attachment component includes a latch mechanism connected to the lateral plates via a latch connector, the latch connector connected to a gate biased by a spring into a closed position to obstruct the passages. The gate is structured and arranged with a biasing portion which, when engaged by the securing members entering the passages, may bias the gate into an open position for the housings to receive the securable members. The gate is further structured and arranged with a securing portion which, once the securable members have stopped against the housings, the gate may be biased back into the closed position, thereby securing the securable members and completing the implement mounting assembly attachment process. The user may then detach the implement attachment assembly from the vehicle by operating a lever connected to gate via the latch connector, thereby biasing the gate into the open position for releasing the securable members from the housings and lowering the frame attachment component from the vehicle attachment component. In some embodiments, the gate may be defined by hooks disposed parallel to the lateral plates, pivotably connected thereto via a latch connector disposed downward from the housings, with outer portions of the hooks defining the biasing portions, and inner portions of the hooks defining the securing portions. Understandably, some embodiments of the present technology may present a latch mechanism that is structured and arranged differently.

Under certain circumstances, the foregoing structure and arrangement may assist in longitudinally and laterally aligning the work implement mounting assembly with respect to the vehicle during the attachment process, the abuttable interface and securable members providing guidance to the flanges and guiding portions of the frame attachment component.

In some embodiments, the attachment mechanism of the present technology may work in combination with a winch and cable system, the winch installed on the vehicle and operatively connected to the implement mounting assembly via the cable, although it should be understood that it is not required to. In such embodiments, the shapes of the frame attachment component and vehicle attachment component of the attachment assembly are adapted one with respect to the other such that an adequate attachment path is defined according to the kinematics of the frame attachment component when attached to the implement mounting assembly being reeled-in by the winch toward the vehicle attachment component for attachment thereto.

In some embodiments, the attachment mechanism of the present technology may work in combination with an impact reduction system although it should be understood that it is not required to. Such embodiments may be structured and arranged such that it may, when used to attach an implement mounting assembly to a vehicle operated to push loads, desirably mitigate the negative effects of impacts being imparted longitudinally to the vehicle via the work implement of the implement mounting assembly.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Introduction

Figure 1:
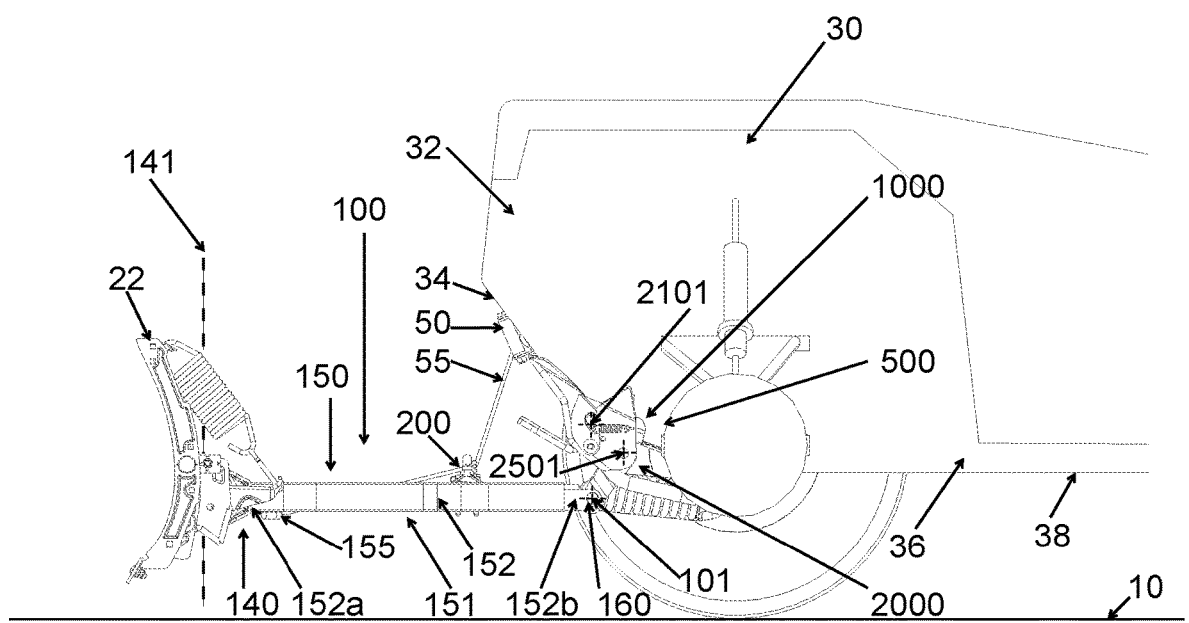
FIG. 1 is a left side elevation view of an attachment system in accordance with an embodiment of the present technology, the attachment system attached to a vehicle and to an implement mounting assembly, the implement mounting assembly operatively attached to a winch cable of the vehicle and positioned horizontally.

In accordance with an aspect of the present technology and with reference to the accompanying FIGS. 1 to 18, an attachment system 500 according to an embodiment of the present technology will be described. It should be understood that the attachment system 500 is merely an embodiment of the present technology. Thus, the description thereof that follows is intended to be only a description of illustrative examples of the present technology. This description is not intended to define the scope or set forth the bounds of the present technology.

Examples of modifications or alternatives to the attachment system 500 are described below. This is done merely as an aid to understanding, and, again, not to define the scope or set forth the bounds of the present technology. These modifications are not an exhaustive list, and, as a person skilled in the art would understand, other modifications are likely possible.

Furthermore, where this has not been done (i.e. where no examples of modifications have been set forth), it should not be interpreted that no modifications are possible and/or that what is described is the sole manner of implementing or embodying that element of the present technology.

In addition, it is to be understood that the attachment system 500 may provide in certain aspects a simple embodiment of the present technology, and that where such is the case it has been presented in this manner as an aid to understanding. As persons skilled in the art would understand, various embodiments of the present technology may be of a greater complexity than what is described herein.

General Description of the Implement Mounting Assembly

Referring to FIGS. 1 to 18, the implement mounting assembly 100 will be generally described.

The implement mounting assembly 100 is structured and arranged to be removably mounted to a vehicle 30 so as to removably mount a work implement 22 to the vehicle 30 via an attachment assembly 500. The vehicle 30 has a frame 32 having a front portion 34 and an underside portion 36, the underside portion having a lowermost point 38. The vehicle further has a winch 50 located on the front portion 34 of the frame 32, the winch 50 being operatively attached to the implement mounting assembly 100 by a cable 55. In the accompanying Figures, the vehicle 30 is an all-terrain vehicle ("ATV"), but the implement mounting assembly 100 could be structured and arranged to be removably mounted to a utility-terrain vehicle ("UTV"), a side-by-side vehicle ("SSV") or any other type of similar vehicle. Also, a left wheel is not shown in the Figures in order to display underlying aspects of the present technology in views taken from a left side of the vehicle 30, whereas some of the Figures show a right wheel 42 attached to the vehicle 30. Furthermore, the work implement 22 illustrated in the Figures is a plow, but other work implements 22 could be mounted to the implement mounting assembly 100.

Figure 2:
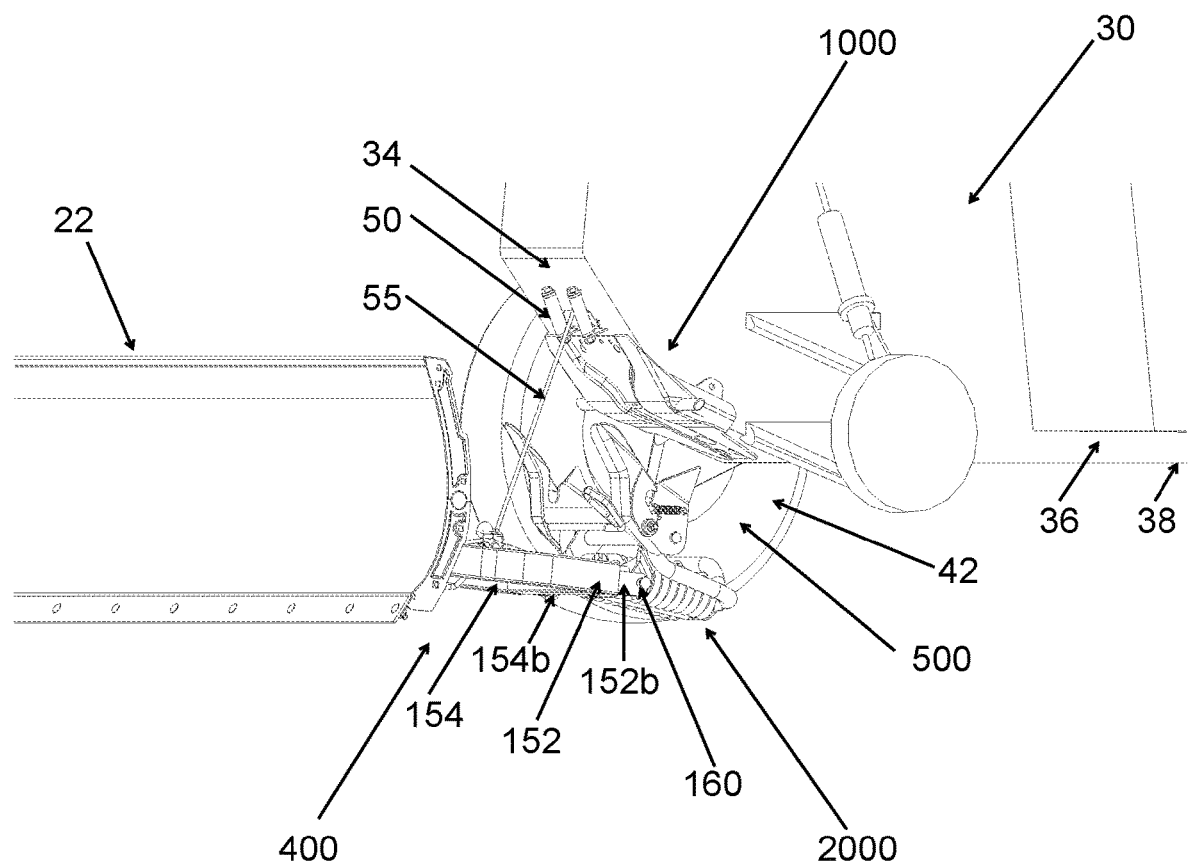
FIG. 2 is an isometric view taken from a bottom, front, left side of the attachment system of FIG. 1, with the vehicle attachment component attached to the vehicle, the frame attachment component attached to the implement mounting assembly, the implement mounting assembly disposed in front of the vehicle and attached to a work implement and to a winch cable of the vehicle, the winch cable partially reeled-in and under tension.

Now referring to FIGS. 1 and 2, the implement mounting assembly 100 has a front portion 140 and a rear portion 150. The front portion 140 extends forwardly and supports the work implement 22. The front portion 140 is pivotably connected to the rear portion 150 via a pivot (not shown). The front portion 140 can thus pivot with respect to the rear portion 150 about a pivot axis 141 so as to orient the work implement 22 in a desired angle. The rear portion 150 has a frame 151 including left and right longitudinally extending members 152, 154. The left longitudinally extending member 152 has a work implement support end 152a, and the right longitudinally extending member 154 has a work implement support end 154a. The work implement support ends 152a, 154a are joined together and support the pivot. The left longitudinally extending member 152 has a vehicle attachment end 152b, and the right longitudinally extending member 154 has a vehicle attachment end 154b. The vehicle attachment ends 152b, 154b are laterally spaced apart. The longitudinal members 152, 154 form a generally V-shaped rear portion 150.

Again referring to FIGS. 1 and 2, a catch 155 is connected on a bottom face of the longitudinal members 152, 154, at the work implement ends 152a, 154a thereof. In other embodiments, the catch 155 could be connected to only one of the left and right longitudinal members 152, 154. The rear portion 150 of the implement mounting assembly 100 also includes a cable management assembly 200. The rear portion 150 further includes a vehicle interfacing connector 160 that is connected to the vehicle attachment ends 152b, 154b. The vehicle interfacing connector 160 is used to pivotably attach the implement mounting assembly 100 to a frame attachment component 2000 of the attachment system 500 which will be further detailed below.

Still referring to FIGS. 1 and 2, a winch 50 is mounted to the front portion 34 of the frame 32 of the vehicle 30. The winch 50 is located between the front right wheel 42 and the front left wheel (not shown). More specifically, the winch is shown mounted above a vehicle attachment component 1000 of the attachment system 500 which will be further detailed below, the vehicle attachment component 1000 being fastened to the vehicle 30. The winch 50 can be operated to retract or extend a winch cable 55. The cable 55 extends downward and forward from the winch 50, veers upward through the cable management assembly and terminates by attaching to the catch 155 of the implement mounting assembly 100. The work implement 22, the implement mounting assembly 100 and the frame attachment component 2000 together form a reelable assembly 400, as best shown in FIG. 2 as well as FIGS. 13 to 17. As will be described further below, the reelable assembly 400 is operatively positionable with respect to the frame 32 of the vehicle 30 using the winch 50 and the cable 55 so as to be attached to the vehicle attachment component 1000 fastened to the vehicle 30.

Figure 13:
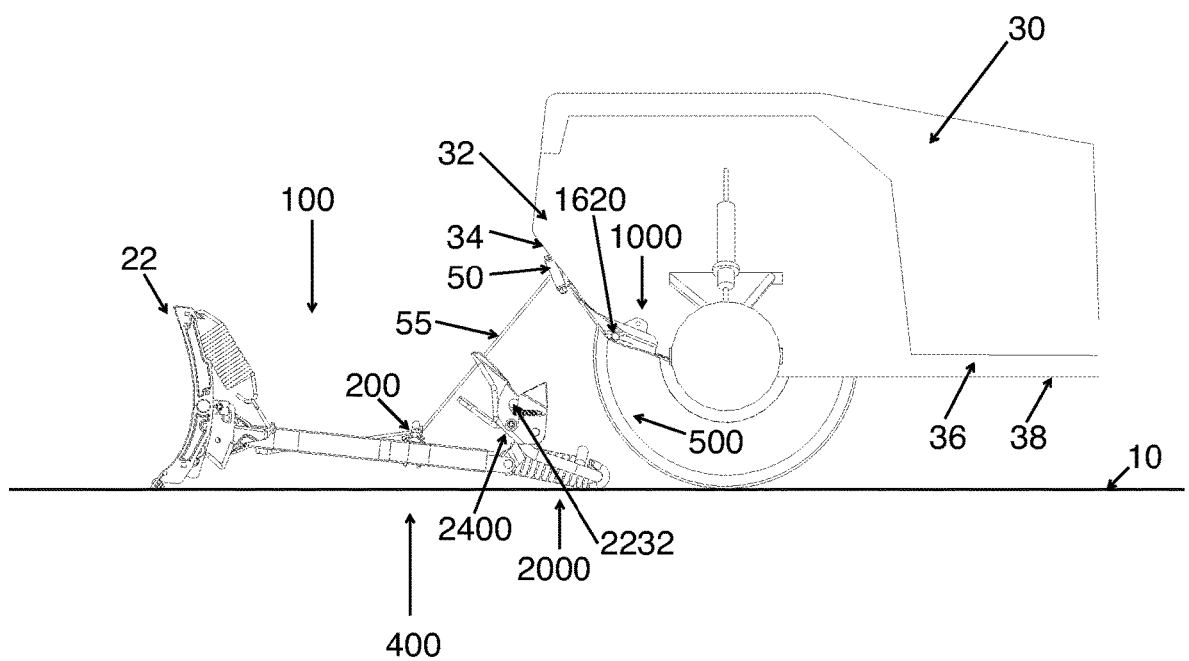
FIG. 13 is a lateral elevation view of the attachment system of FIG. 12, the implement mounting assembly disposed in front of the vehicle, a portion of the work implement and a portion of the frame attachment component both touching the ground surface.

Now referring to FIG. 13, the reelable assembly 400 is laid on a ground surface 10, the cable 55 extends from the vehicle 30 through the cable management assembly 200, the cable 55 is attached to the catch 155, and the reelable assembly 400 is positioned to be mounted to the vehicle 30.

Description of the Attachment System

Figure 3:
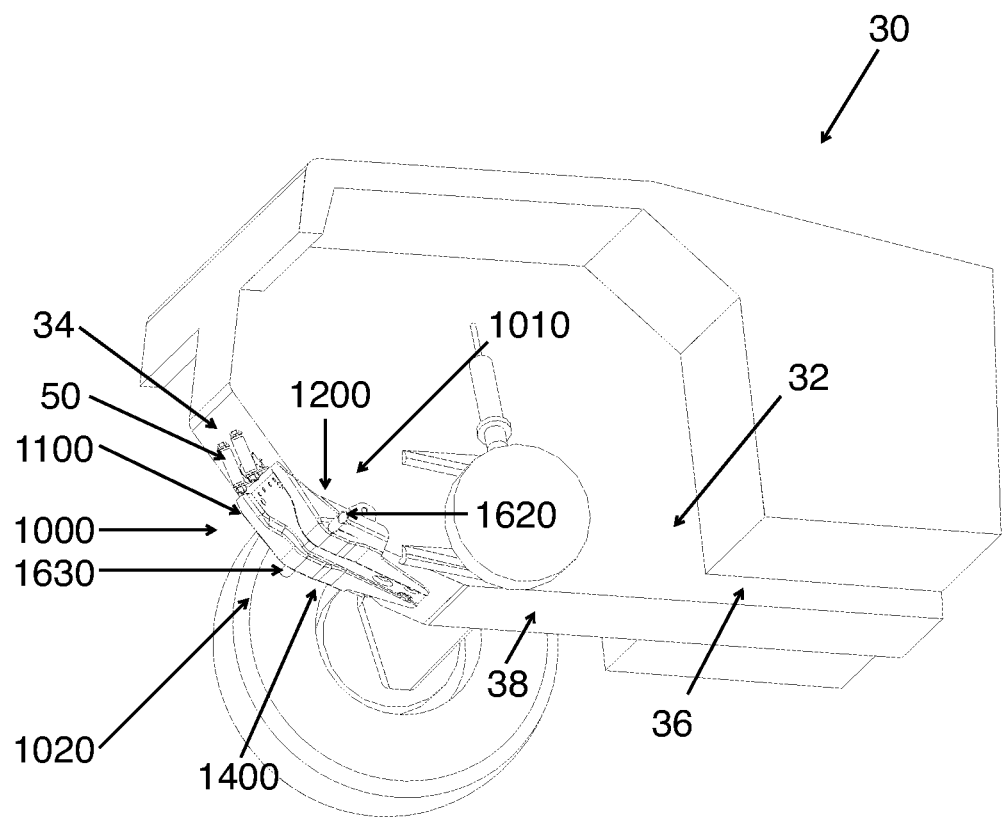
FIG. 3 is an isometric view taken from a bottom, front, left side of a vehicle attachment component of the attachment system of FIG. 1, shown attached to a vehicle.
Figure 17:
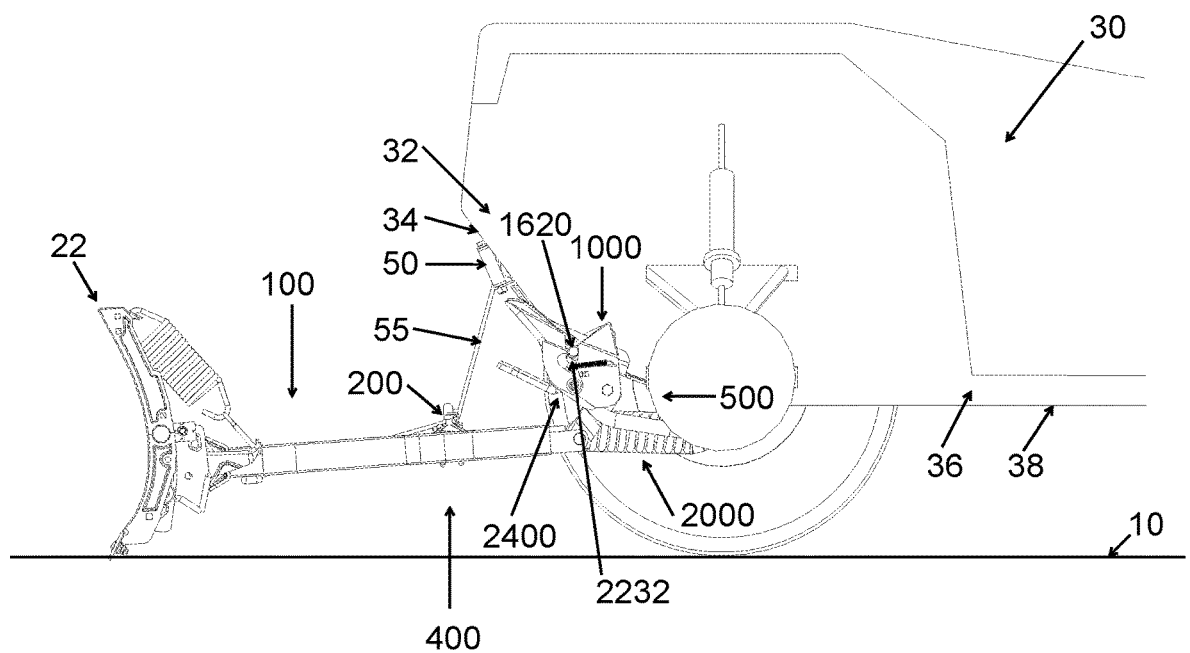
FIG. 17 is a lateral elevation view of the attachment system of FIG. 16, the winch cable further reeled-in, the securable member of the vehicle attachment component engaged toward a housing of the frame attachment component, and a portion of the work implement touching the ground surface.
Figure 18:
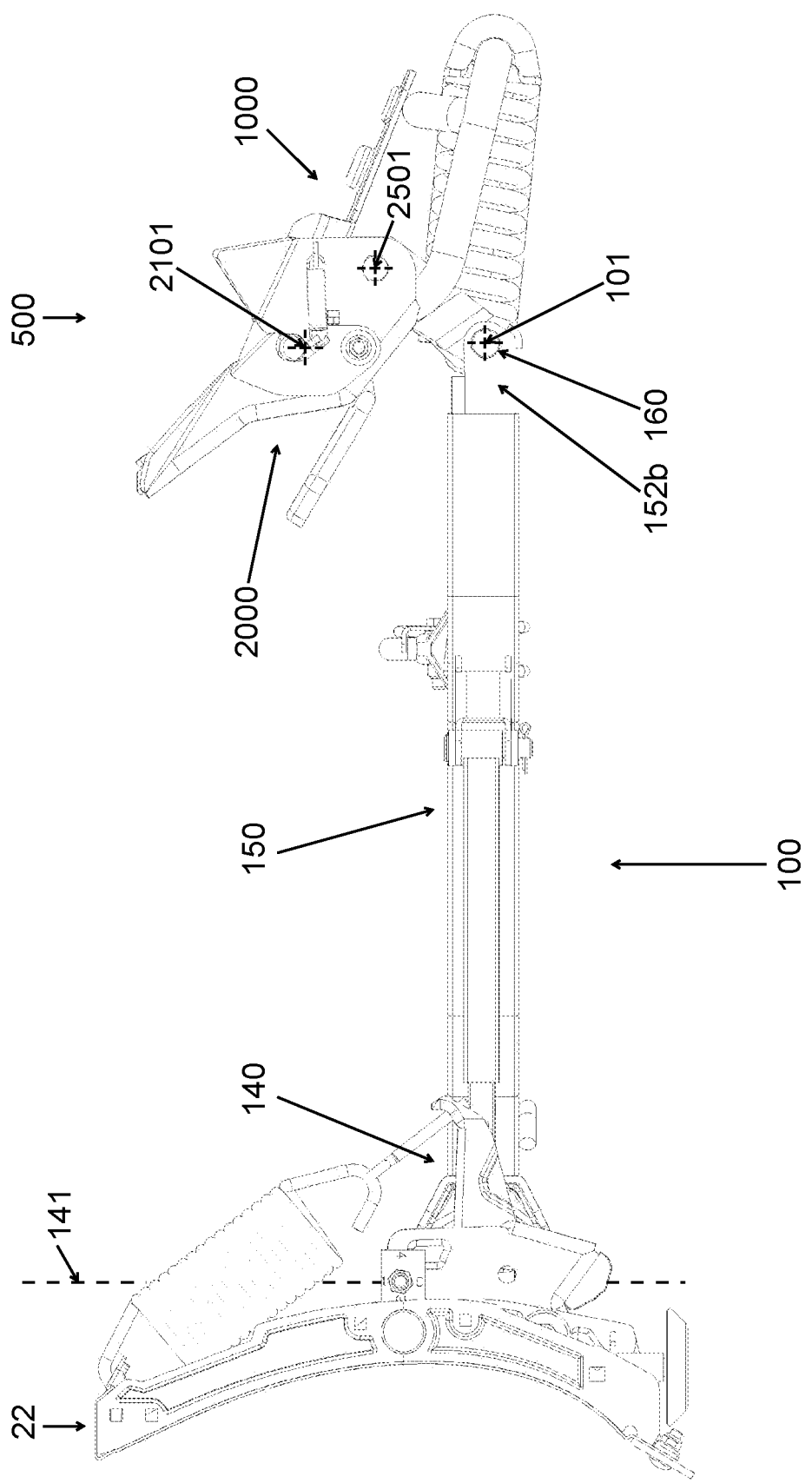
FIG. 18 is a lateral elevation view of the attachment system of FIG. 1, attached to an implement mounting assembly disposed horizontally.

Referring to FIGS. 1 to 18, an embodiment of the attachment system of the present technology will be described. As best shown in FIG. 3, the attachment system 500 includes the vehicle attachment component 1000 that may be fastened to the vehicle 30 via the fastenable interface 1010, and may be abutted and secured to the frame attachment component 2000 via the abuttable interface 1020 and securable members 1620, 1630. As best shown in FIG. 18, the frame attachment component 2000 is pivotably connectable to the vehicle interfacing connector 160 of the rear portion 150 of the implement mounting assembly 100, the attachment system 500 thereby allowing the vehicle 30 to operate the implement mounting assembly 100 and the work implement 22 attached to the front portion 140 thereof.

The attachment system 500 of the present embodiment has a symmetrical configuration, having left and right sides defined by a lateral plane, the lateral plane coinciding with the central lateral plane (not shown) of the vehicle 30 when the attachment system 500 is mounted to the vehicle 30. Although the following description and Figures may emphasize on the left side, it shall be understood that the right side is a mirror image thereof. It shall also be understood that other embodiments of the present technology not described herein may include immaterial singularities that render the configuration of the attachment system non-symmetrical.

Vehicle Attachment Component

Figure 4:
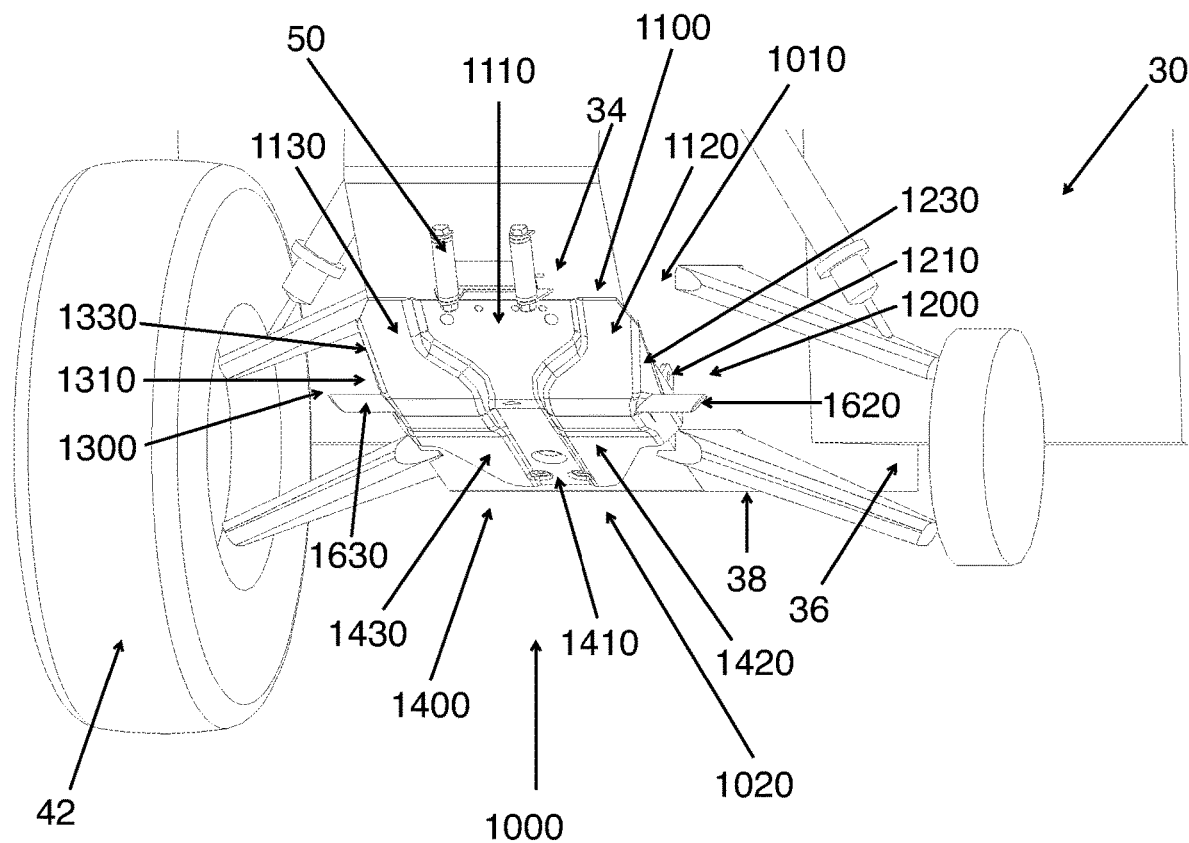
FIG. 4 is a perspective view taken from a bottom, front, left side of the vehicle attachment component of the attachment system of FIG. 1, shown attached to a vehicle.

Referring to FIGS. 3 and 4, the vehicle attachment component 1000 of the present embodiment will be described. The vehicle attachment component 1000 is shown fastened with fasteners (not shown) to a front portion 34 of the frame 32 located downward from the winch 50, forward from the front axle (not shown) of the vehicle 30 and between the front wheels (only the right wheel 42 is shown).

The vehicle attachment component 1000 includes a front plate 1100, lateral plates 1200, 1300 and an underside plate 1400, structured and arranged one with respect to the other to form a tri-directional (i.e. longitudinal, lateral and vertical) fastenable interface 1010 with respect to the vehicle 30, the fastenable interface 1010 being structured and arranged to withstand and distribute operating loads imparted by an attached implement mounting assembly 100 to the vehicle 30.

On the outward facing side of the vehicle attachment component 1000, the front plate 1100, lateral plates 1200, 1300 and underside plate 1400 define a tri-directional (i.e. longitudinal, lateral and vertical) abuttable interface 1020 with respect to the frame attachment component 2000, the abuttable interface 1020 protruding forwardly and downwardly from the front portion 34 of the frame 32 of the vehicle 30.

Referring to FIG. 4, the front plate 1100 includes left and right front abutments 1120, 1130 disposed bilaterally from a front fastenable portion 1110, the front fastenable portion 1110 being recessed inwardly from the left and right front abutments 1120, 1130. The lateral plates 1200, 1300 respectively include left and right lateral abutments 1230, 1330 as well as left and right lateral fastenable portions 1210, 1310 extending upwardly therefrom. The underside plate 1400 has left and right underside abutments 1420, 1430 disposed bilaterally from an underside fastenable portion 1410 recessed inwardly therefrom. More specifically, the underside fastenable portion 1410 is disposed rearwardly from the front fastenable portion 1110.

It shall be understood that, in other embodiments, the vehicle attachment component 1000 could be fastened via a fastenable interface 1010 structured and arranged differently, the front 1100, lateral 1200, 1300 and underside 1400 plates adapted to the shape of the front portion 34 of the frame 32 of a vehicle 30.

Furthermore, it shall be understood that, in other embodiments, the abuttable interface 1020 of the vehicle attachment component 1000 may also be structured and arranged differently, the abuttable interface 1020 protruding forwardly and downwardly from the front portion 34 of the frame 32 in a direction adapted to receive the implement mounting assembly 100 when attached to the vehicle 30 along a given attachment path.

The vehicle attachment component 1000 further includes left and right securable members 1620, 1630 shaped as rods extending horizontally and laterally from the lateral abutments 1230, 1330. The securable members 1620, 1630 that are illustrated in the Figures could however be defined otherwise in other embodiments. For example, securable members could be partly directed upward or forward, or even form a single securable member.

Frame Attachment Component

Now referring to FIGS. 5 to 7, the frame attachment component 2000 will be described. In this embodiment, the frame attachment component 2000 includes an attachable portion 2100 and a pivotable portion 2500 pivotably connected to one another, and further linked to one another via a spring assembly 2600, as best shown in FIG. 6.

Figure 5:
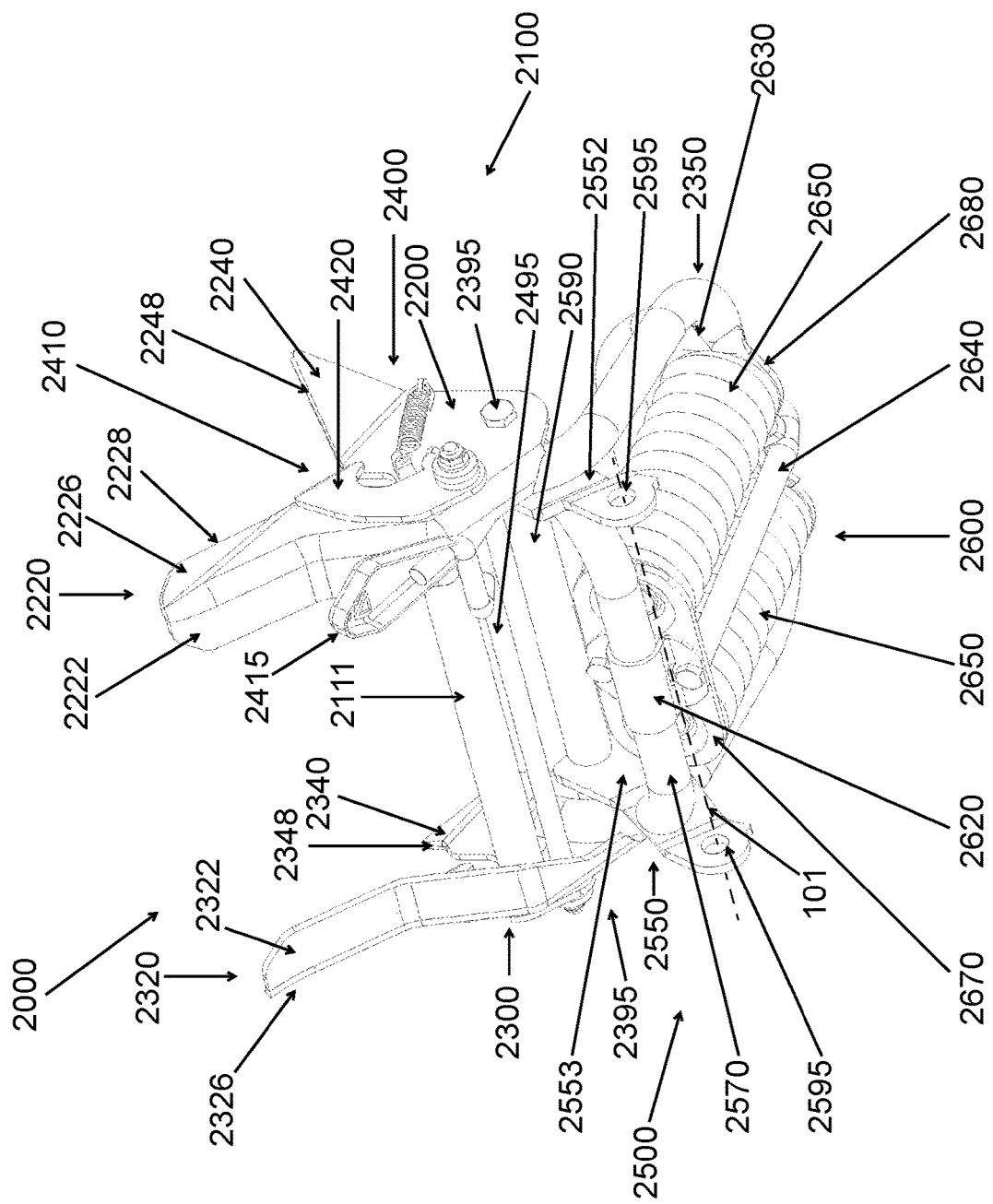
FIG. 5 is an isometric view taken from a bottom, front, left side of a frame attachment component of the attachment system of FIG. 1.

Referring to FIG. 5, the attachable portion 2100 includes left and right lateral plates 2200, 2300 extending vertically and joined together by a first linkage 2111 disposed transversely therebetween. From each of the lateral plates 2200, 2300, leading flanges 2220, 2320 and trailing flanges 2240, 2340 flanges upwardly. The left and right leading flanges 2220, 2320 further define front 2222, 2322 and lateral 2226, 2326 leading flange portions.

Figure 6:
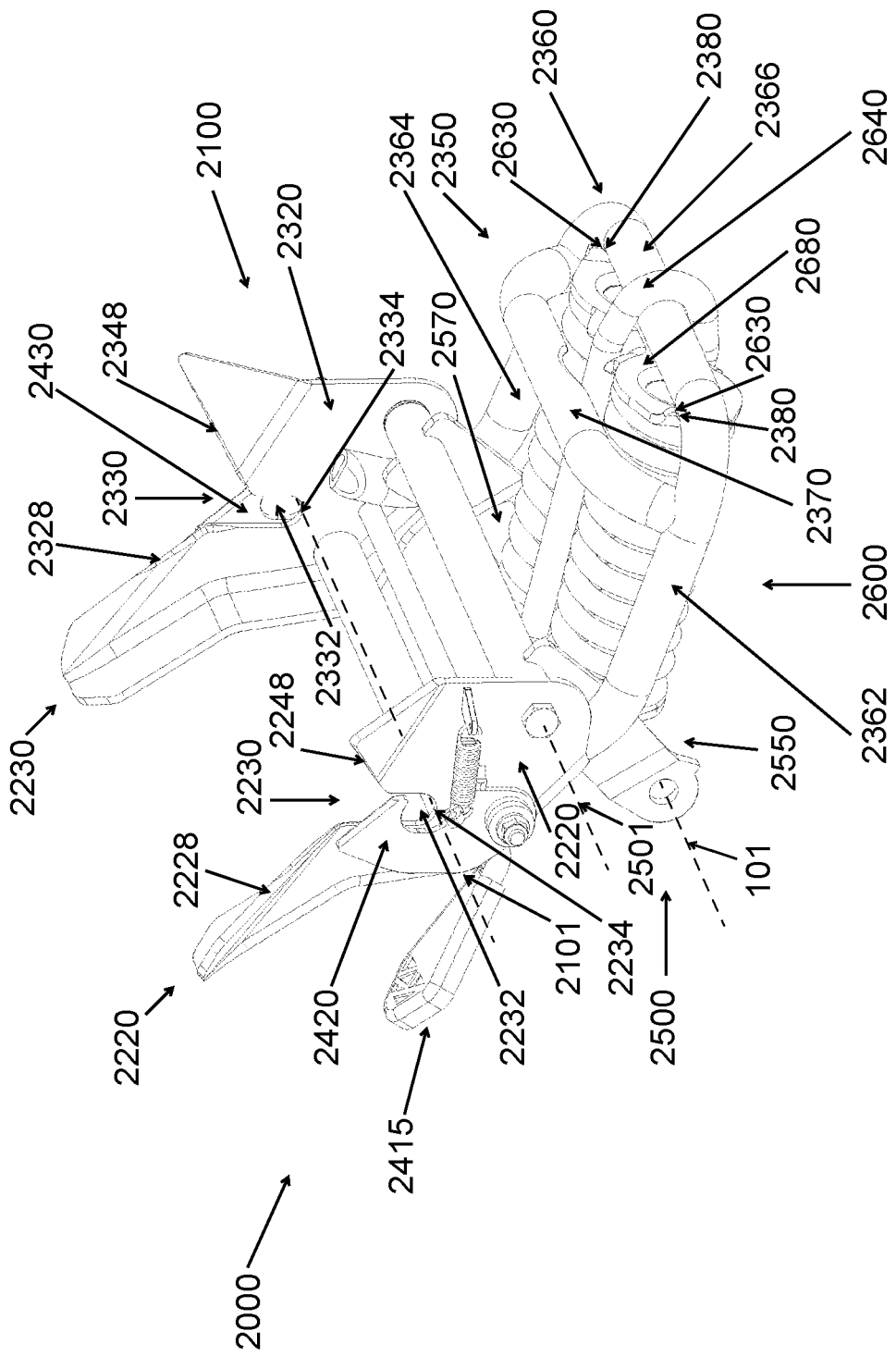
FIG. 6 is an isometric view taken from a top, rear, left side of the frame attachment component of the attachment system of FIG. 1.
Figure 7:
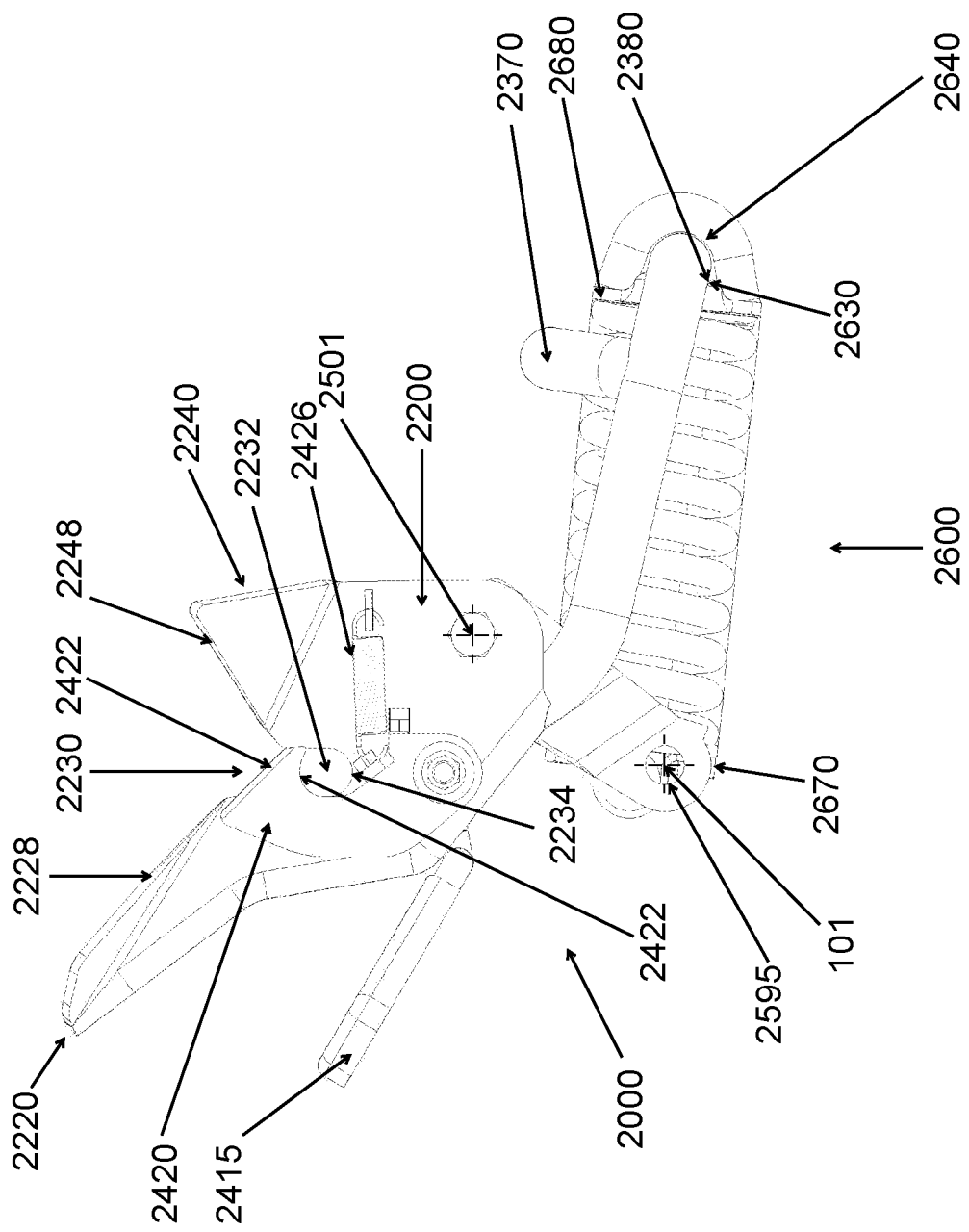
FIG. 7 is a left side elevation view of the frame attachment component of the attachment system of FIG. 1.

Referring to FIG. 6, leading guiding portions 2228, 2328 of the leading flanges 2220, 2320 and trailing guiding portions 2248, 2348 of the trailing flanges 2240, 2340 converge toward passages 2230, 2330. Defined into the lateral plates 2200, 2300, the passages 2230, 2330 are vertical slots extending downward to housings 2232, 2332, the passages and the housings dimensioned to receive the left and right securable members 1620, 1630 of the vehicle attachment component 1000. The housings 2232, 2332 further have left and right lowermost points defining vertical stops 2234, 2334 for assisting in securing the securable members 1620, 1630, the vertical stops 2234, 2334 together defining a securing axis 2101, also shown in FIG. 18.

Again referring to FIGS. 5 to 7, the attachable portion 2100 further includes a latch 2400 having a gate 2410 pivotably connected to the lateral plates 2200, 2300 via a latch connector 2495. The latch 2400 is structured and arranged such that the gate 2410 is biased to pivot in a closed position, thereby obstructing the passages 2230, 2330. In the present embodiment, the gate 2410 comprises left 2420 and right 2430 hooks, each having a biasing portion 2422, 2432 and a securing portion 2424, 2434, the hooks 2420, 2430 being interconnected to the lateral plates 2200, 2300 via latch springs 2426, 2436. The latch 2400 is also structured and arranged such that when attaching the frame attachment component 2000 to the vehicle attachment component 1000, the passages 2230, 2330 may guide the attachable portion 2100 along the securable members 1620, 1630, thereby engaging the biasing portions 2422, 2432 onto the securable members thereby biasing the gate 2410 into an open position (shown on FIG. 17). The gate 2410 is biased back into the closed position by the latch springs 2426, 2436 once the securable members 1620, 1630 have abutted vertical stops 2234, 2334, thereby securing the securable members 1620, 1630 into the housings 2232, 2332. In order to detach the implement mounting assembly 100 from the vehicle 30, the user may operate the lever 2415 attached to the latch connector 2405 to bias the gate 2410 in the open position, allowing to release the securable members 1620, 1630 and to detach the frame attachment component 2000 from the vehicle attachment component 1000.

Referring to FIG. 6, the frame attachment component 2000 further includes a second linkage 2350 extending rearward from the lateral plates 2220, 2320. The second linkage 2350 defines a second linkage longitudinal member 2360 being U-shaped. Left and right portions 2362, 2364 are respectively attached to the lateral plates 2220, 2320 and extend rearward therefrom, then veer inward to join and define a rear portion 2366. The left and right portions 2362, 2364 are further interconnected by a second linkage lateral member 2370 disposed therebetween and forward from the rear portion 2366, the rear portion 2366 defining a second linkage connector 2380 being pivotably connected to a rear spring assembly connector 2630 of the rear plate 2680 of the spring assembly 2600.

Referring to FIG. 5, the pivotable portion 2500 of the present embodiment includes a third linkage 2550 defining left 2552 and right 2553 arms transversely linked to a pivotable portion connector 2590 and extending therefrom toward a frame attachment connector 2595 shaped as an aperture. The frame attachment connector 2595 is pivotably attachable to the vehicle interfacing connector 160 of the implement mounting assembly 100 and defines an implement pivoting axis 101, also shown in FIGS. 1, 8 and 18. When the frame attachment component 2000 is attached to the vehicle 30 via the vehicle attachment component 1000, the implement pivoting axis 101 is located downward from the securing axis 2101 and downward from the underside portion 36 of the frame 32, as best shown in FIG. 1. In variations to the present embodiment, the implement pivoting axis 101 may be located within 2 to 5 inches downward from the lowermost point 38 of the frame 32.

Now referring to FIGS. 5 and 6, the third linkage 2550 is pivotably connected to the attachable portion connector 2395 via the pivotable portion connector 2590 for pivoting about a horizontal pivotable portion pivoting axis 2501 parallel to the implement pivoting axis 101, the frame attachment connector 2595 being biased in a position forward from the attachment portion connector 2395 (best shown in FIG. 1). To this effect, the left and right third linkage arms 2552, 2553 are further interconnected by a third linkage lateral member 2570 disposed inbetween, the lateral member 2570 being pivotably connected to a front plate 2670 of the spring assembly 2600 via a front spring assembly connector 2620. The spring assembly 2600 further includes springs 2650, disposed longitudinally between the front and rear plates 2670, 2680 and connected thereto, the rear plate 2680 being pivotably connected to the rear portion 2366 of the second linkage 2350. When the implement mounting assembly 100 is attached to the vehicle 30 via the attachment system 500, the frame attachment connector 2595 is biased in a position forward from the attachable portion connector 2395 by the spring assembly 2600, the position dictated by the structure and arrangement of the spring assembly longitudinal member 2640 with respect to the second linkage 2350, straddling the rear portion 2366 thereof.

Figure 8:
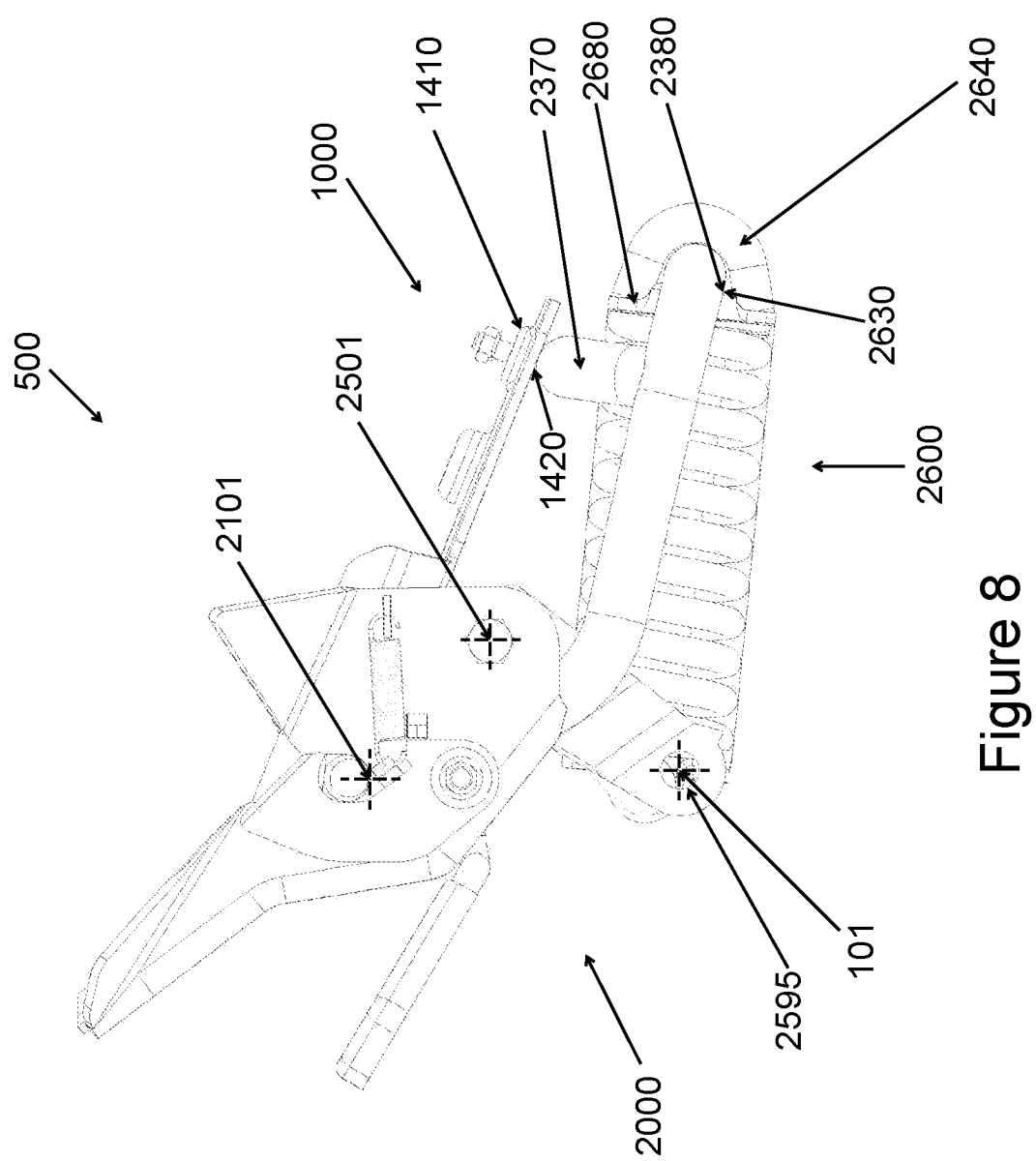
FIG. 8 is a left side elevation view of the frame attachment component and the vehicle attachment component of the attachment system of FIG. 1, with the frame attachment component attached to the vehicle attachment component.
Figure 9:
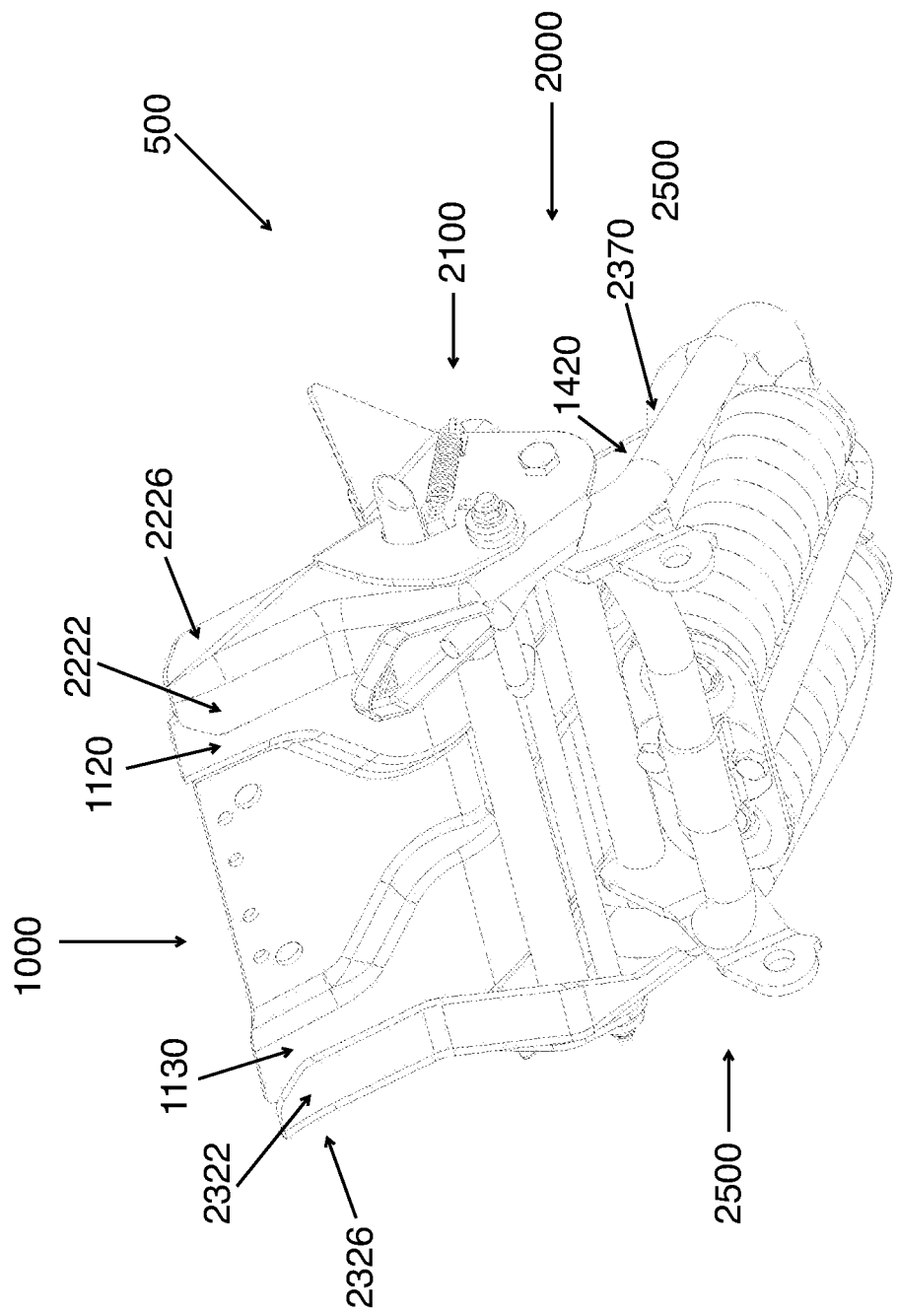
FIG. 9 is an isometric view taken from a bottom, front, left side of the frame attachment component and the vehicle attachment component of the attachment system of FIG. 1, with the frame attachment component attached to the vehicle attachment component.

Referring to FIGS. 8 and 9, when the frame attachment component 2000 is attached to the vehicle attachment component 1000 the second linkage lateral member 2370 is structured and arranged to abut on the left 1420 and right (not shown) underside abutments. As best seen on FIG. 9, the left and right front leading flange portions 2222, 2322 are structured and arranged to abut onto the left and right front abutments 1120, 1130. However, it shall be understood that, in other embodiments of the present technology, the frame attachment component 2000 and the vehicle attachment component 1000 may be structured and arranged to abut differently against one another.

Referring to FIG. 8, when the implement mounting assembly 100 (not shown) is imparted with a rearward load, the impact of such a load may, under certain circumstances, be mitigated by the attachment assembly 500 of the present embodiment. When imparted with such a load via the frame attachment connector 2595, the third linkage 2550 may pivot counter clockwise about the pivotable portion pivoting axis 2501, thereby longitudinally compressing the springs 2650 of the assembly 2600 as a function of the imparted load and displacing the frame attachment connector 2595 rearward. The rearmost position of the frame attachment connector 2595 is defined by a limitation imparted by inner rods 2662 disposed coaxially with the springs 2650 and connected to front and rear plates 2670, 2680 of the spring assembly 2600, as best shown in FIG. 6. In other embodiments, the rearmost position of the frame attachment connector 2595 could be defined differently. A reduction or removal of the rearward load would allow the third linkage 2550 to pivot clockwise about the pivotable portion pivoting axis 2501, as biased by the spring assembly 2600.

It shall be understood that other embodiments of the present technology may not provide longitudinal impact mitigation functionality and therefore may include a frame attachment component that does not define a pivotable portion distinct from an attachable portion and does not include a spring assembly interconnected therebetween. In such embodiments, the frame attachment connector 2595 pivotably connects the frame attachment component 2000 (e.g. via the lateral plates 2200, 2300) to the vehicle interfacing connector 160 of the implement mounting assembly 100, such that when the frame attachment component 2000 is attached to the vehicle 30 via the vehicle attachment component 1000, the implement pivoting axis 101 is located downward from the securing axis 2101 and downward from the underside portion 36 of the frame 32.

Figure 10:
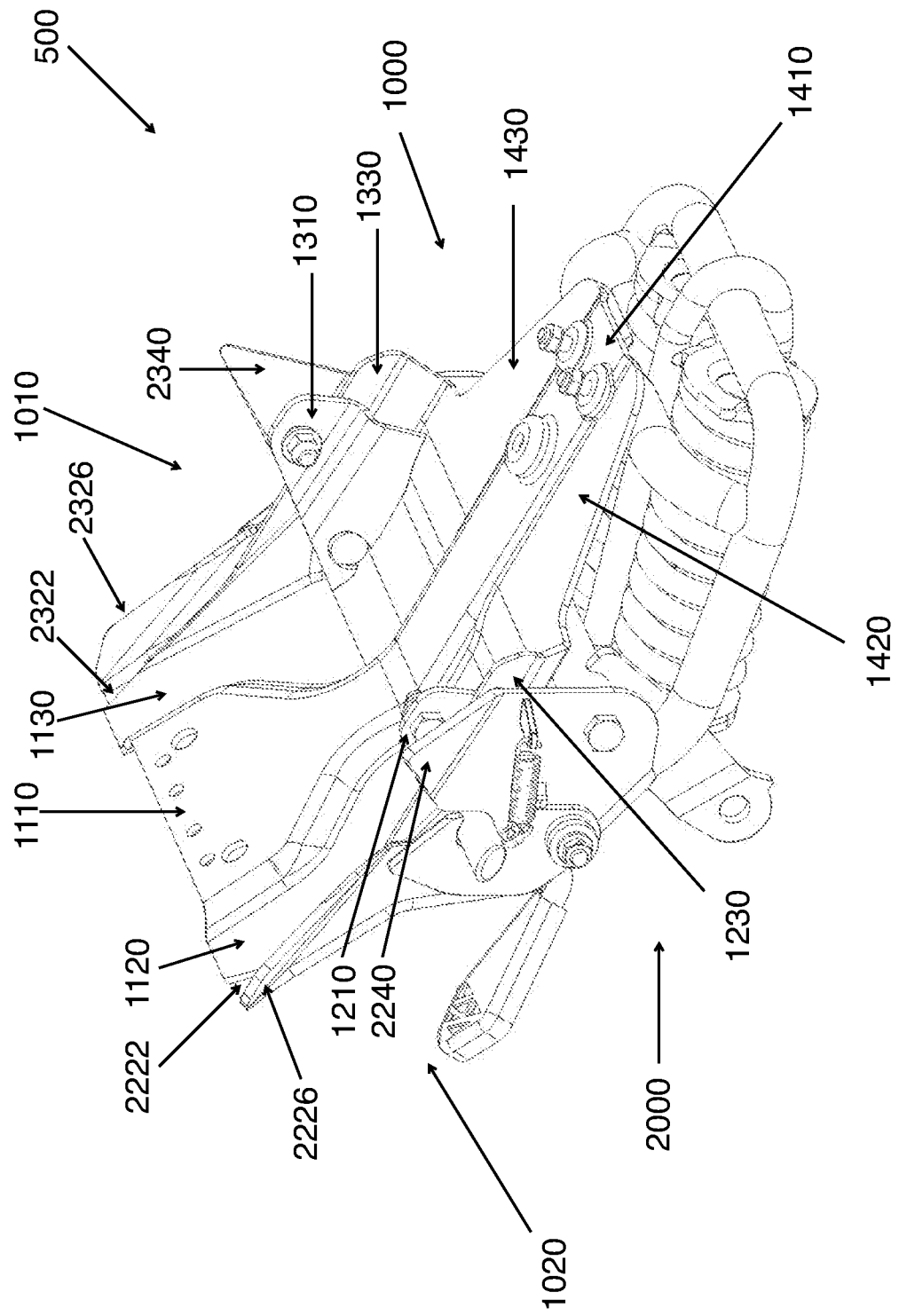
FIG. 10 is an isometric view taken from a top, rear, left side of the frame attachment component and the vehicle attachment component of the attachment system of FIG. 1, with the frame attachment component attached to the vehicle attachment component.
Figure 11:
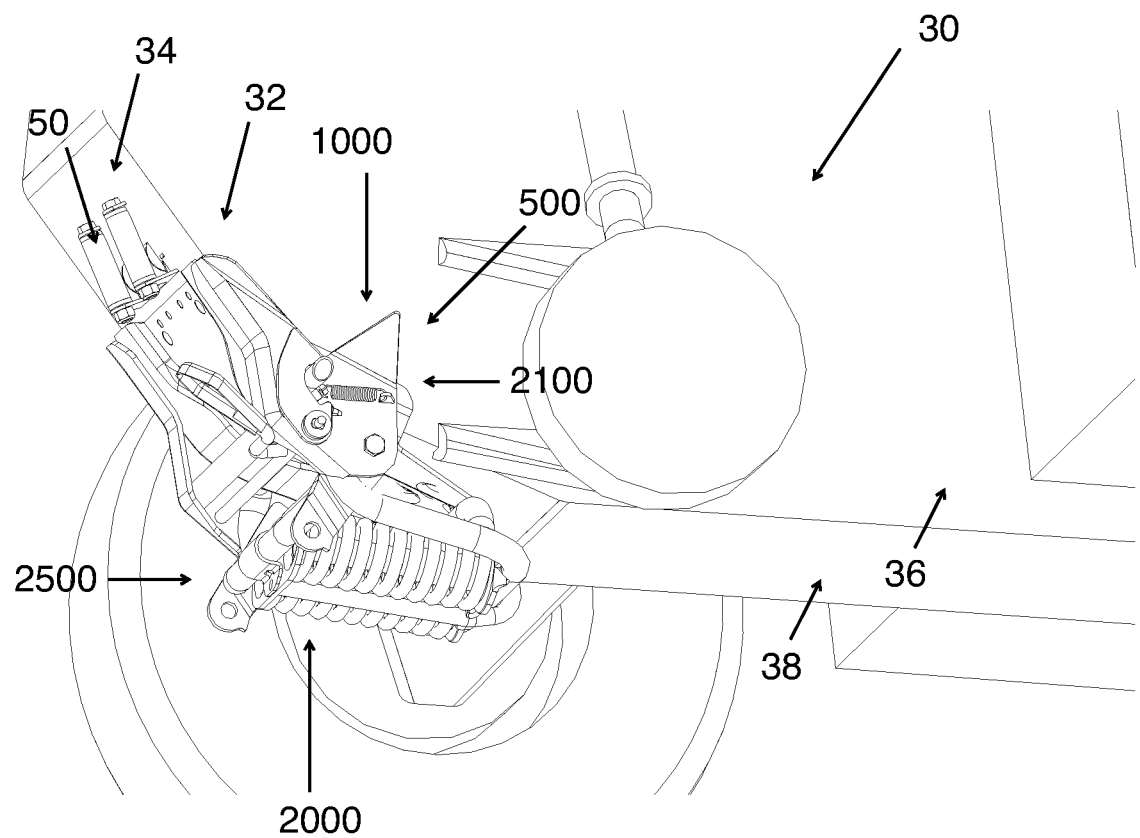
FIG. 11 is an isometric view taken from a bottom, front, left side of the frame attachment component and the vehicle attachment component of the attachment system of FIG. 1, with the frame attachment component attached to the vehicle attachment component and the vehicle attachment component fastened to the vehicle.
Figure 12:
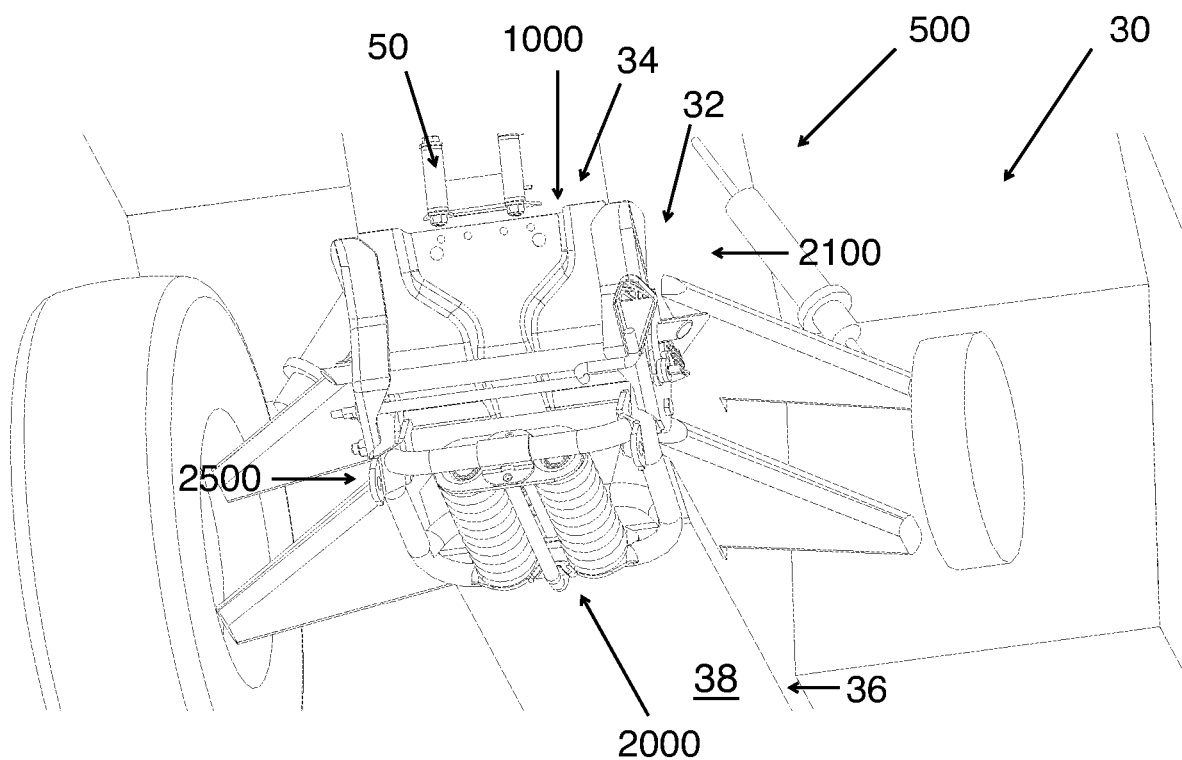
FIG. 12 is a perspective view taken from a bottom, front, left side of the frame attachment component and the vehicle attachment component of the attachment system of FIG. 1, with the frame attachment component attached to the vehicle attachment component and the vehicle attachment component fastened to the vehicle.

FIGS. 9 and 10 further detail the relative positions of the frame attachment component 2000 with respect to the vehicle attachment component 1000 when attached thereto. For instance, FIG. 10 best shows the fastenable interface 1010, as well as the relationship between the trailing flanges 2240, 2340 of the frame attachment assembly 2000 with respect to the lateral fastenable portions 1210, 1310 and to the lateral abutments 1230, 1330 of the vehicle attachment component 1000. FIGS. 11 and 12 provide close up, perspective detailed views of the attachment system 500 of the present technology with respect to the vehicle 30, the implant mount assembly 100 not shown mounted thereto.

Description of the Process of Attaching the Implement Mounting Assembly to the Vehicle Referring to FIG. 1 and FIGS. 13 to 18, the process of attaching the implement mounting assembly 100 to the vehicle 30 using the attachment system 500 will be generally described.

In order to attach the implement mounting assembly 100 to the vehicle 30, the user must first attach the frame attachment component 2000 to the vehicle interfacing connector 160 of the implement mounting assembly 100, and the work implement 22 to the front portion 140 thereto. Under certain circumstances, the work implement 22, the implement mounting assembly 100 and the frame attachment component 2000, defining the reelable assembly 400, may be left attached to one another to shorten the process.

Figure 14:
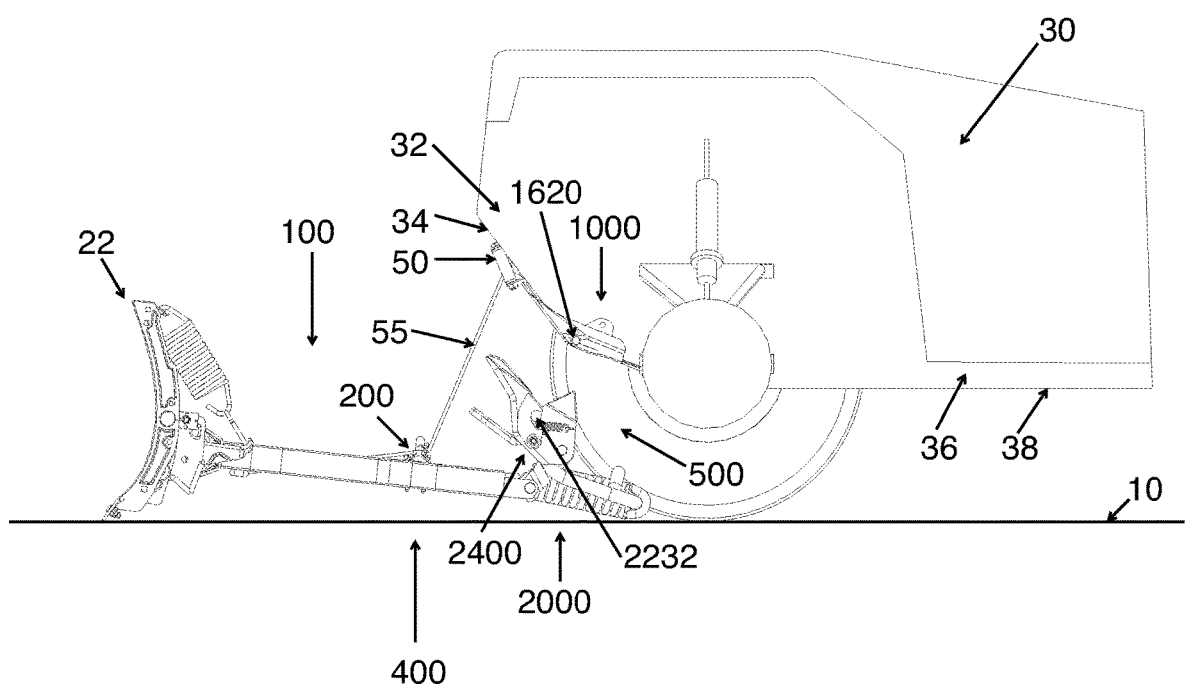
FIG. 14 is a lateral elevation view of the attachment system of FIG. 13, the winch cable further reeled-in, a portion of the frame attachment component disposed underneath a portion of the vehicle, the portion of the work implement and the portion of the frame attachment component both touching the ground surface.
Figure 15:
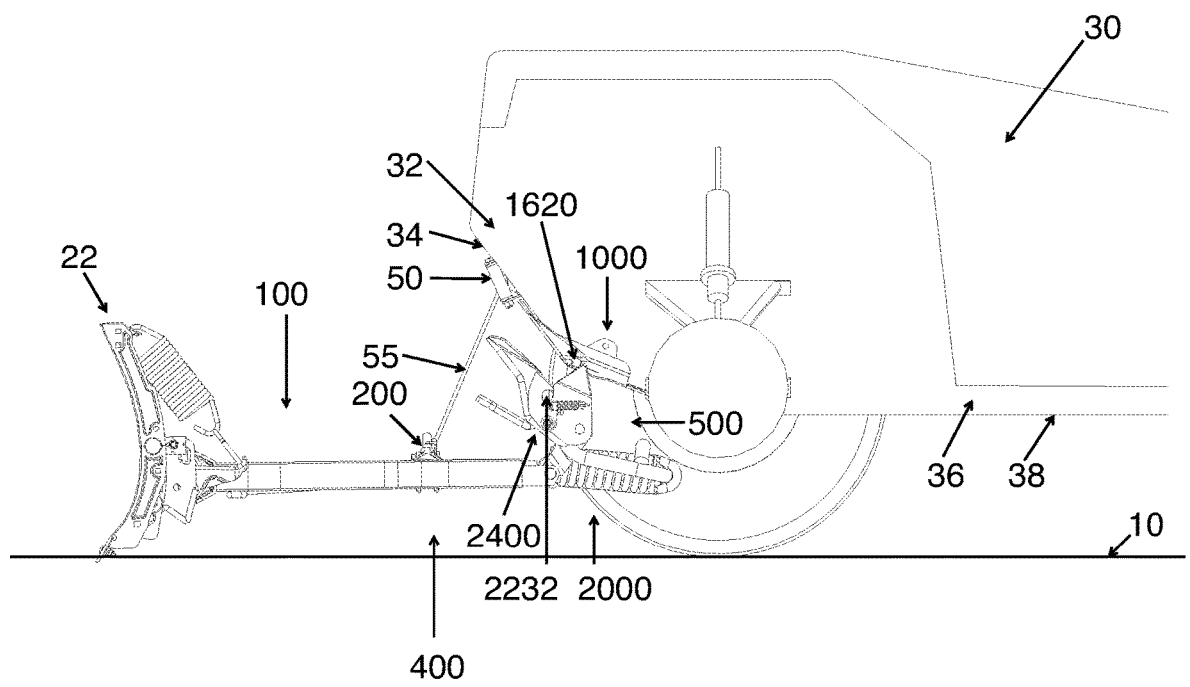
FIG. 15 is a lateral elevation view of the attachment system of FIG. 14, the winch cable further reeled-in, the frame attachment component hanging above the ground surface and the portion of the work implement touching the ground surface.
Figure 16:
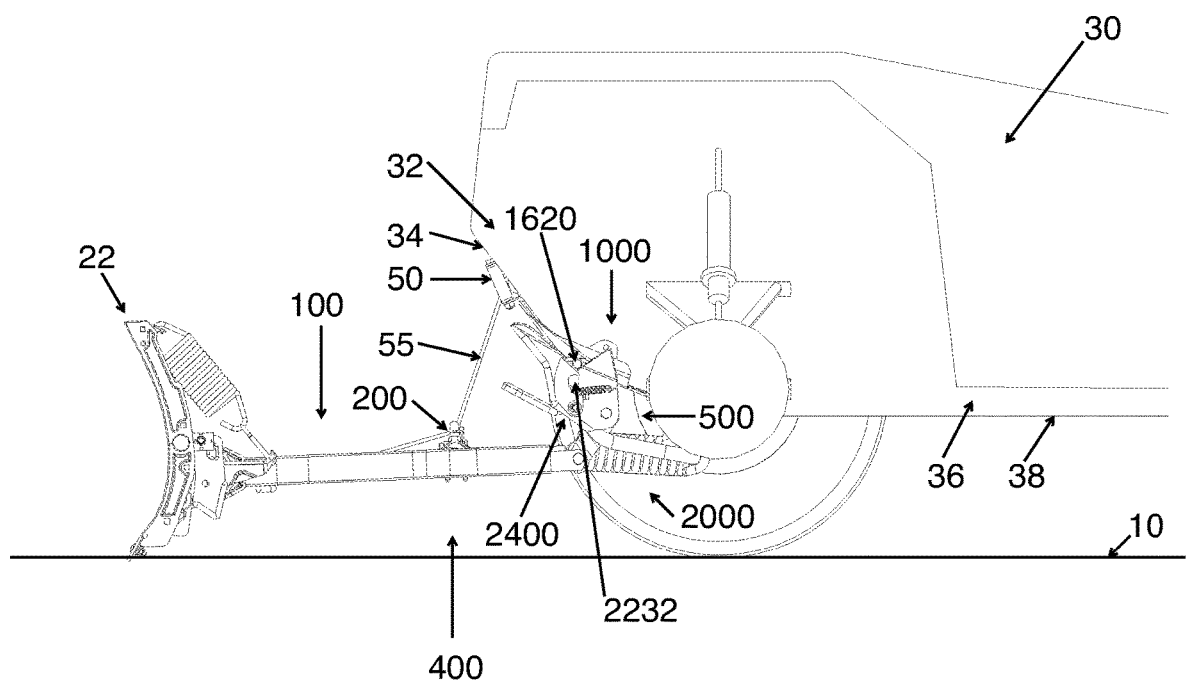
FIG. 16 is a lateral elevation view of the attachment system of FIG. 15, the winch cable further reeled-in, the frame attachment component hanging above the ground surface in alignment with the vehicle attachment component, a latch of the frame attachment component engaging with a securable member of the vehicle attachment component and the portion of the work implement touching the ground surface.

As shown in FIG. 13, the user must then position the vehicle 30 rearward from the frame attachment component 2000 of the reelable assembly 400, with the vehicle 30 aligned longitudinally with the reelable assembly 400. The user must then unwind the cable 55 from the winch 50 of the vehicle, engage the cable 55 in the cable management assembly 200 of the implement mounting assembly 100 and attach it to the catch 155 thereof. Then, by operatively using the winch 50 to reel the cable 55, the user may progressively displace and raise the reelable assembly 400 toward the vehicle 30 and the vehicle attachment component attached thereto (FIG. 14). By further reeling of the winch 50, trailing guiding portions 2248, 2348 (not shown) guide the frame attachment component 2000 along the securable members 1620, 1630 (FIG. 15), followed by engagement with the latch 2400 (FIG. 16) biased in the open position (FIG. 17). The final reeling of the winch 55 brings the housings 2232, 2332 against the securable members 1620, 1630, allowing the latch 2400 to be biased back into the closed position, thereby completing the attachment process, as shown in FIG. 1.

Under certain circumstances, undesirable movements imparted to the reelable assembly 400 as it is being lifted off the ground surface 10 toward the vehicle 30 and hangs from the cable 55 may be mitigated by the attachment system 500 of the present technology. The abuttable interface 1020 (FIG. 3) of the vehicle attachment component 1000 is structured and arranged with respect to the leading flanges 2220, 2320 and the trailing flanges 2240, 2340 (FIG. 6) of the frame attachment component 2000 such that adequate tri-directional (i.e. longitudinal, lateral and vertical) alignment may be achieved for the attachment process to finish nonetheless. For example, the left leading 2220 and trailing 2240 flanges may abut the left lateral abutment 1330 to counter a lateral movement of small amplitude toward the right and stabilize the reelable assembly 400 as it is reeled-in. Similarly, the front leading flange portions 2222, 2322 may abut the front abutments 1120, 1130 to counter a longitudinal movement of small amplitude toward the rear of the vehicle 30. Finally, as described above, the guiding portions 2228, 2328, 2248, 2348 or the vertical stops 2234, 2334 may abut the securable members 1620, 1630 and desirably limit upward vertical movements of the reelable assembly 400 as it is reeled-in.

The invention claimed is:

1. A mount assembly for mounting a work implement assembly to a vehicle having an undercarriage, a horizontal plane being defined by a lowermost point of the undercarriage when the vehicle is on a horizontal flat ground surface, the work implement assembly including a work implement, a frame and a work-implement-assembly connector supported by the frame, the mount assembly comprising:

a vehicle-mount structure fastenable to a portion of the vehicle, the vehicle-mount structure including a vehicle-mount-structure connector, the vehicle-mount structure being configured such that when the vehicle-mount structure is fastened to the vehicle and the vehicle is on the horizontal flat ground surface, the vehicle-mount structure is located entirely above the horizontal plane;

a work-implement-assembly-mount structure pivotably connectable to the work-implement-assembly connector about a first horizontal pivot axis, the work-implement-assembly-mount structure including a work-implement-assembly-mount-structure connector structured to be releasably connectable to the vehicle-mount-structure connector for mounting the work implement assembly to the vehicle, the work-implement-assembly mount structure being configured such that when the vehicle-mount structure is fastened to the vehicle and the vehicle is on the horizontal flat ground surface, and the work-implement-assembly-mount-structure connector is connected to the vehicle-mount-structure connector, the first horizontal pivot axis is located below the horizontal plane.

2. The mount assembly of claim 1, wherein the work-implement-assembly mount structure is configured such that when the vehicle-mount structure is fastened to the vehicle and the vehicle is on the horizontal flat ground surface, and the work-implement-assembly-mount-structure connector is connected to the vehicle-mount-structure connector, the first horizontal pivot axis is located below the horizontal plane by a distance of between 2 to 5 inches.

3. The mount assembly of claim 1, wherein, when the vehicle-mount structure is fastened to the vehicle, the vehicle-mount structure is located rearward of a forwardmost point of the vehicle.

4. The mount assembly of claim 3, wherein the vehicle-mount structure further includes a vehicle-mount-structure anterior surface facing forwardly and downwardly when the vehicle-mount structure is fastened to the vehicle and the vehicle is on the horizontal flat ground surface.

5. The mount assembly of claim 4, wherein the work-implement-mount structure further includes a work-implement-mount-structure anterior surface shaped to register with the vehicle-mount-structure anterior surface when the work-implement-mount-structure connector is connected to the vehicle-mount-structure connector.

6. The mount assembly of claim 5, wherein the work-implement-mount-structure connector is pivotably connectable to the vehicle-mount-structure connector about a vehicle-mount-structure-connector axis for pivoting the work-implement-mount structure about the vehicle-mount-structure-connector axis, and when the work-implement-mount-structure anterior surface registers with the vehicle-mount-structure anterior surface, the work-implement-mount-structure anterior surface registers with the vehicle-mount-structure anterior surface to prevent pivoting of the work-implement-mount structure about the vehicle-mount-structure-connector axis.

7. The mount assembly of claim 1, wherein the vehicle-mount structure further includes a vehicle-mount-structure posterior surface extending rearwardly when the vehicle-mount structure is fastened to the vehicle and the vehicle is on the horizontal flat ground surface.

8. The mount assembly of claim 7, wherein the work-implement-mount structure further includes a work-implement-mount-structure posterior surface shaped to register with the vehicle-mount-structure posterior surface when the work-implement-mount-structure connector is connected to the vehicle-mount-structure connector.

9. The mount assembly of claim 8, wherein the work-implement-mount-structure connector is pivotably connectable to the vehicle-mount-structure connector about a vehicle-mount-structure-connector axis for pivoting the work-implement-mount structure about the vehicle-mount-structure-connector axis, and when the work-implement-mount-structure posterior surface registers with the vehicle-mount-structure posterior surface, the work-implement-mount-structure posterior surface registers with the vehicle-mount-structure posterior surface to prevent pivoting of the work-implement-mount structure about the vehicle-mount-structure-connector axis.

10. The mount assembly of claim 1, wherein the work-implement-mount structure further includes a linkage, the work-implement-mount structure pivotably connectable to the work-implement-assembly connector about the first horizontal pivot axis via the linkage.

11. The mount assembly of claim 10 whereby when the vehicle is on a horizontal ground surface, the vehicle-mount structure is fastened to the vehicle and the vehicle-mount-structure connector is connected to the work-implement-mount-structure connector:
the work-implement-mount-structure connector is located above the horizontal plane, and;
the linkage extends from above the horizontal plane to below thereof.

12. The mount assembly of claim 10, wherein the linkage is pivotably connected to the work-implement-mount-structure connector for pivoting about a second horizontal pivot axis.

13. The mount assembly of claim 12, wherein when the vehicle is on the horizontal ground surface, the vehicle-mount structure is fastened to the vehicle and the vehicle-mount-structure connector is connected to the work-implement-mount-structure connector, the second horizontal pivot axis located higher than the first horizontal pivot axis.

14. A mount assembly for mounting a work implement assembly to a vehicle; the work implement assembly including a frame supporting a work implement, a work-implement-assembly connector and a winch connector; the work-implement-assembly connector and the winch connector supported by the frame; the vehicle including an undercarriage and a winch operatively connectable to the winch connector for pulling the frame toward the vehicle; a horizontal plane being defined by a lowermost point of the undercarriage when the vehicle is on a horizontal flat ground surface; the mount assembly comprising:
a vehicle-mount structure fastenable to the vehicle, the vehicle-mount structure including a vehicle-mount-structure connector; and
a work-implement-mount structure connectable to the work-implement-assembly connector, the work-implement-mount structure including a work-implement-mount-structure connector releasably connectable to the vehicle-mount-structure connector for mounting the work implement assembly to the vehicle when the work-implement-mount-structure connector is in longitudinal, lateral and vertical alignment with the vehicle-mount-structure connector;
when
the vehicle-mount-structure is fastened to the vehicle,
the work-implement-mount structure is connected to the work-implement-assembly connector,
the winch is connected to the winch connector, and
the winch pulls the work-implement-assembly frame towards the vehicle,
a guided portion of the work-implement-mount structure is cooperable with a guiding portion of the vehicle-mount structure to orient the work-implement-mount-structure connector relative to the vehicle-mount-structure connector to be in longitudinal, lateral and vertical alignment therewith.

* * * * *